United States Patent
Wang et al.

(10) Patent No.: US 8,930,665 B2
(45) Date of Patent: Jan. 6, 2015

(54) DATA ACCESS SYSTEM AND DATA ACCESS METHOD

(75) Inventors: Chih-Min Wang, Hsinchu (TW); Chao-ping Su, Hsinchu (TW); Shih-Jan Wei, Keelung (TW); Ming-Hong Huang, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1401 days.

(21) Appl. No.: 12/251,744

(22) Filed: Oct. 15, 2008

(65) Prior Publication Data

US 2009/0100234 A1  Apr. 16, 2009

(30) Foreign Application Priority Data

Oct. 16, 2007  (TW) ................................ 96138597 A

(51) Int. Cl.
 *G06F 13/42* (2006.01)
 *G06F 1/32* (2006.01)
 *G06F 1/10* (2006.01)
(52) U.S. Cl.
 CPC .......... *G06F 1/3225* (2013.01); *G06F 13/4234* (2013.01); *G06F 2213/16* (2013.01); *G06F 1/10* (2013.01)
 USPC ....................................................... 711/167
(58) Field of Classification Search
 USPC ....................................................... 711/167
 See application file for complete search history.

(56) References Cited

U.S. PATENT DOCUMENTS

| | | | | |
|---|---|---|---|---|
| 5,878,240 A * | 3/1999 | Tomko | ........................ | 710/316 |
| 6,032,243 A * | 2/2000 | Chuang | ........................ | 711/220 |
| 6,240,508 B1 * | 5/2001 | Brown et al. | ................. | 712/219 |
| 6,333,888 B1 * | 12/2001 | Nakazawa | ............... | 365/230.03 |
| 2007/0183249 A1 * | 8/2007 | Yang et al. | ..................... | 365/233 |

FOREIGN PATENT DOCUMENTS

| | | |
|---|---|---|
| CN | 85107221 A | 7/1986 |
| CN | 1372202 A | 10/2002 |

OTHER PUBLICATIONS

Daniel d. Gajski, Principles of Digital Design, 1997, Prentice-Hall, Inc., pp. 281-284.*

* cited by examiner

*Primary Examiner* — Jared Rutz
(74) *Attorney, Agent, or Firm* — Edell, Shapiro & Finnan, LLC

(57) ABSTRACT

A data access system and a data access method achieving effects of power saving and access synchronization during data access are provided. The data access system includes a data processing unit, a bridge device and a memory device. The data processing unit sends an access request signal to initiate data access of at least one unit data. The access of unit data is completed within a plurality of clock cycles of a reference clock signal. The bridge device generates an access signal according to the access request signal, the reference clock signal and a leading time. A pulse of the access signal is determined by the leading time within the clock cycles. The memory device executes the access of the unit data according to the access signal.

13 Claims, 3 Drawing Sheets

DATA ACCESS SYSTEM AND DATA ACCESS METHOD

CROSS REFERENCE TO RELATED PATENT APPLICATION

This patent application claims priority to Taiwan, R.O.C. patent application No. 096138597 filed Oct. 16, 2007.

FIELD OF THE INVENTION

The present invention relates to a data access system and a data access method, and more particularly to a data access system and a data access method achieving effects of power saving and access synchronization.

BACKGROUND OF THE INVENTION

In prior electronic systems, when a microcontroller or a microprocessor accesses one of external registers, e.g. a register of an IP component, a clock signal and an address signal are first sent to each external register. Each external register decodes the address signal to determine whether the register itself is the access target, followed by the clock signal completing the data access. The clock signal is sent to several flip-flops of the each register; for example, an 8-bit register has 8 flip-flops. When the external registers receive the clock signal, their flip-flops will act, so as to consume the power. However, as a system becomes more complicated including increasingly larger numbers of registers, the system becomes highly power consuming. In particular, if an electronics system is powered by batteries, the power consumption is a critical factor that affects the lifespan of the batteries.

In addition, when a system uses a large number of registers, distances between the microcontroller and various registers create access skew which is unfavorable to data access synchronization. In the prior art, fine tuning of access clocks is required when a microcontroller accesses registers of different distances to balance the effects of the skew. As such, the circuit design complication is increased this way. Further, when a large number of registers are used in a system, the skew is likely to become too complex to fine tune. Therefore, the traditional approach focusing on fine tuning the registers is deficient on keeping both skew and corresponding circuit design uncomplicated and fails to provide an optimal synchronization effect.

SUMMARY OF THE INVENTION

Therefore, a primary objective of the present invention is to provide a data access system and a data access method for achieving a power saving effect during data access.

Another objective of present invention is to provide a data access system and a data access method for achieving a data synchronization effect during data access.

The present invention provides a data access system for generating an access signal to a memory device. Then, the memory device executes an access of a unit data according to the access signal. The data access system according to the present invention comprises: a data processing unit, activating an access request signal for initiating an access of at least one unit data, wherein the access of the unit data is executed within a plurality of clock cycles of a reference clock signal; a bridge device, comprising an access signal generating unit for activating the access signal in response to the access request signal, the reference clock signal and a leading time, wherein the access signal includes a pulse, and the timing of the pulse within the clock cycles is determined by the leading time.

The present invention further provides a data access method for accessing a memory device. The data access method according to the present comprises steps of: activating an access request signal for initiating an access of at least one unit data of the memory device, wherein the access of the unit data is executed within a plurality of clock cycles of a reference clock signal; activating an access signal according to the access request signal, the reference clock signal and a leading time, wherein the access signal includes a pulse, and the timing of the pulse within the clock cycles is determined by the leading time; and executing the access of the unit data according to the access signal.

The present invention further provides a data access system. The data access system according to present invention comprises: a data processing unit, sending a write request signal, a corresponding address signal and a data signal for initiating a writing of at least one unit data, wherein the width of a data bus of the data processing unit is a positive integer N; a bridge device, comprising an address decoding unit for generating a bit selection signal according to the address signal and the write request signal; and a memory device, coupled to the bridge device, and selecting N bit of the data signal to execute the writing of the unit data according to the bit selection signal when N is smaller than the bit count of the data signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
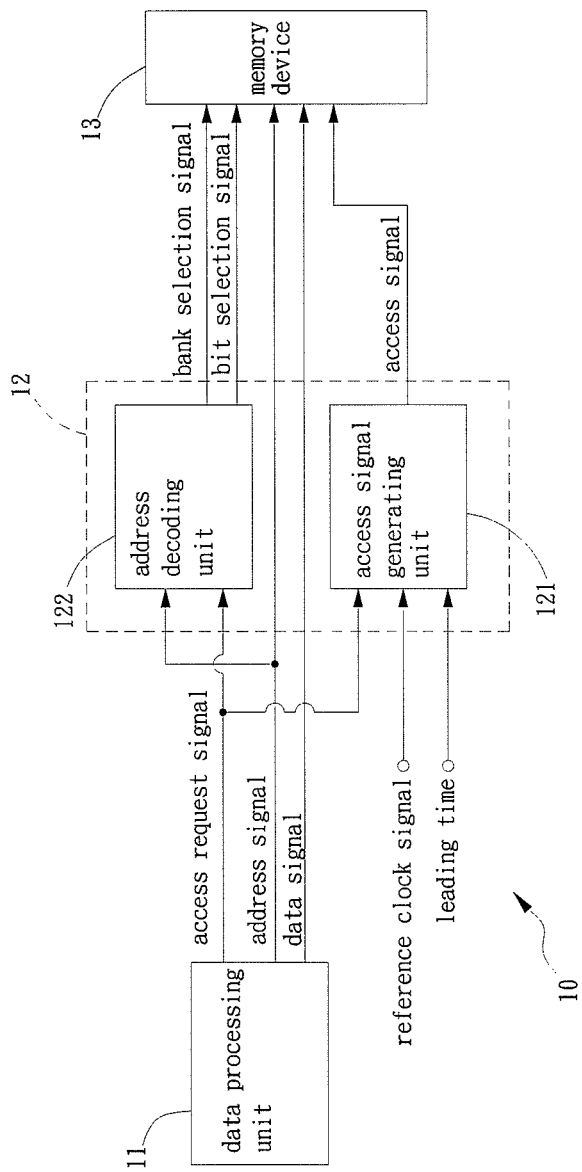
FIG. 1 is a block diagram of a data access system according to an embodiment of the present invention.

FIG. 1 is a block diagram of a data access system according to an embodiment of the present invention. A data access system 10 comprises a data processing unit 11, a bridge device 12 and a memory device 13. The data processing unit 11 sends an access request signal and a corresponding address signal to initiate data access of at least one unit data. The access request signal is a write request signal or a read request signal. When the access request signal is a write request signal, the data processing unit 11 also sends a data signal corresponding to the write request signal to the memory device 13 to write the data into the memory device 13. The access of the unit data is completed within a plurality of clock cycles (represented by M) of the reference clock signal. In one embodiment of the present invention, the data processing unit 11 is a microcontroller, a microprocessor, etc., the bit count of the unit data equals the width of the data bus of the data processing unit, and may be, for example, 8 or a multiple of 8. The reference clock signal is the system clock of the data access system 10 or the clock rate of the data processing unit 11.

The bridge device 12 is coupled to the data processing unit 11 and comprises an access signal generating unit 121 and an address decoding unit 122. The access signal generating unit 121 generates an access signal according to the access request signal, the reference clock signal and a leading time. The access signal is then sent to the memory device 13. The access signal has a pulse to let the memory device 13 execute the access of the unit data. Within the M clock cycles for executing the access of the unit data, the timing of the pulse is determined by the leading time. For example, the leading time is determined as a time interval between a starting point of the M clock cycles and a starting point of the pulse. In other words, if the leading time is k clock cycles, the starting point of the pulse is the starting point of the (k+1)th clock cycle among the M clock cycles. In a preferred embodiment according to the present invention, in addition to the leading time, the timing of the pulse within the M clock cycles is also determined by a trailing time (not shown). For example, the trailing time is determined as a time interval between an ending point of the pulse and an ending point of the M clock cycles. When the timing of the pulse is determined by the leading time and the trailing time, the pulse width is also determined. That is, if the leading time is k clock cycles and trailing time is p clock cycles, the pulse width is (M-k-p) clock cycles.

Figure 2:
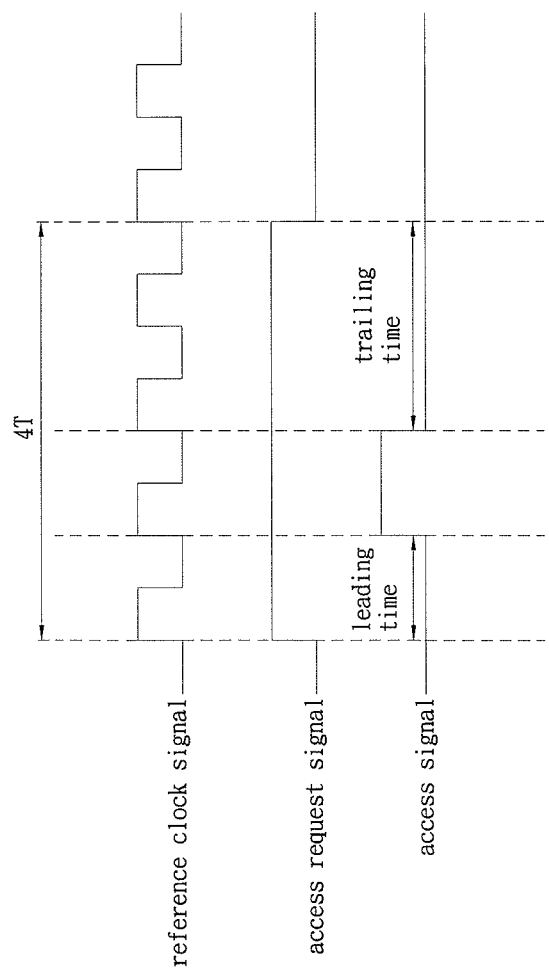
FIG. 2 is a timing diagram of a reference clock signal, an access request signal and an access signal in an example when M=4.

FIG. 2 shows a timing diagram of the reference clock signal, access request signal and the access signal in an example when M=4. In the timing diagram, T represents the clock cycle. As shown in the FIG. 2, the leading time is 1T, the trailing time is 2T. Accordingly, the pulse of the access signal is located at the second clock cycle, and has a width of 1T (4-1-2=1).

Lengths of the leading time and the trailing time are configurable parameters, which are adjustable according to actual circuit designs. For example, it is necessary that the data signal provided by the data processing unit 11 should reach stabilization before executing writing in. A time needed for the data processing unit 11 to stabilize is a set-up time. Suppose a long set-up time is required, the leading time can be extended to delay the timing point of the data writing. Or, when a longer period is required to access a storage location in the memory device 13, the data access may not be able to complete within the M clock cycles. Therefore, the trailing time is extended to provide an earlier time point of data writing, so as to assure that data access of all storage locations of the access to memory device 13 are completed within the M clock cycles.

According to the aforementioned design for access signals, the data access system 10 achieves dual effects of power saving and data access synchronization. Firstly, the memory device 13 executes data access directly with the pulse of the access signal instead of having to receive the reference clock signal therein prior to the data access. That is, when the memory device 13 executes data access, a role of the reference clock signal is replaced by the access signal. Due to the fact that the number of pulses of the access signal is less than that of the reference clock signal (as shown in the FIG. 2, the former is a quarter of the latter), the memory device 13 is even more power saving when executing data access with the pulse of the access signal. Further, since various storage locations in the memory device 13 are located at different distances from the data processing unit 11, skew is incurred when accessing the various storage locations. Therefore, by way of the leading time and the trailing time, timing of the pulse of the access signal are adjusted to ensure that data access of all storage locations can be completed within the M clock cycles. As a result, although skew is present when accessing the various storage locations, access synchronization is considered as accomplished from the perspective of data processing unit 11 as long as data access of the various storage locations is completed within the M clock cycles.

The storage space of the memory device 13 is divided into a plurality of memory banks. The address decoding unit 122 generates a bank selection signal according to the address signal generated by the data processing unit 11. The bank selection signal is sent to memory device 13 to select a memory bank. The selected memory bank further decodes the address signal to identify the storage location to be accessed, and then executes the access of the unit data according to the access signal generated by the access signal generating unit 121. For example, the selected memory bank executes data access of the unit data at the rising edge or falling edge of the access signal. Power consumption is reduced owing to that the access signal need only be sent to the selected memory bank rather than to all of the memory banks. In a preferred embodiment, the address decoding unit 122 generates the bank selection signal according to at least one most significant bit of the address signal. The selected memory bank identifies the storage location according to remaining bits of the address signal. For example, suppose the memory device 13 has $2^8$=256 storage locations that are divided into 8 memory banks, each of which then has 32 storage locations. By adopting an 8-bit address signal for determining the location, the address decoding unit 122 uses the three most significant bits of the address signal to generate the bank selection signal. The selected memory bank then identifies the storage location according to the remaining 5 bits of the address signal to execute data access.

Alternatively, the memory device 13 may be a DRAM, an SRAM, or registers having flip-flops. When the memory device 13 is consisted of registers, reading operation of the flip-flop does not involve pulse signals. Accordingly, when the access request signal is a read request signal, the access signal generated by the access signal generating unit 121 need not be sent to the memory device 13, and data access of the memory device 13 only requires the address signal and the bank selection signal, thereby further reducing power consumption.

In addition, when data access of the unit data is completed upon ending of the M clock cycles, the bridge device 12 sends an acknowledgement signal (not shown) to the data processing unit 11 to notify the data processing unit 11 that a next step such as executing a program instruction can be proceeded.

According to a preferred embodiment of the present invention, suppose the data processing ability of the data processing unit 11 is N-bit width, when N is smaller than the bit count of the data signal, the memory device 13 selects N bits of the data signal according to a bit selection signal so as to execute writing of the unit data. The bit selection signal is generated by the address decoding unit 122 according to the address signal. For example, when N is 8 and the bit count of the data signal is 16, the memory device 13 selects 8 most significant bits or 8 least significant bits according to the bit selection signal to execute writing. When each address of the memory device 13 corresponds to an 8-bit storage location, the address decoding unit 122 generates the bit selection signal according to one least significant bit of the address signal. In other words, when the least significant bit is 0, the bit selection signal selects 8 least significant bits of the data signal for writing; when the least significant bit is 1, the bit selection signal selects 8 most significant bits of the data signal for writing. As a result, if the data processing unit 11 is an 8-bit microcontroller, the data processing unit 11 shares a common bridge device 12 with another 32-bit microcontroller (or microprocessor, not shown) and accesses the memory device 13 in a unit of 16 bits (16-bit data signals). To be more explicit, when the data processing unit 11 executes writing under the circumstances that the data processing unit 11 is an 8-bit microcontroller, the data processing unit 11 stores the 8-bit data in the 8 least significant bits of the data signal if the least significant bit of the address signal sent is 0, and in the 8 most significant bits of the data signal if the least significant bit of the address signal is 1. Thus, one 16-bit data writing is completed by writing unit data twice. On the other hand, when the data processing unit 11 is a 32-bit microcontroller, the 32-bit microcontroller only uses the 16 least significant (or most significant) bits for the 32-bit data bus, and stores the 16 least significant (or most significant) bits in 16 bits of the data signal. At this point, the bit selection signal is ignored and writing of 16-bit data is completed by writing one unit data.

Figure 3:
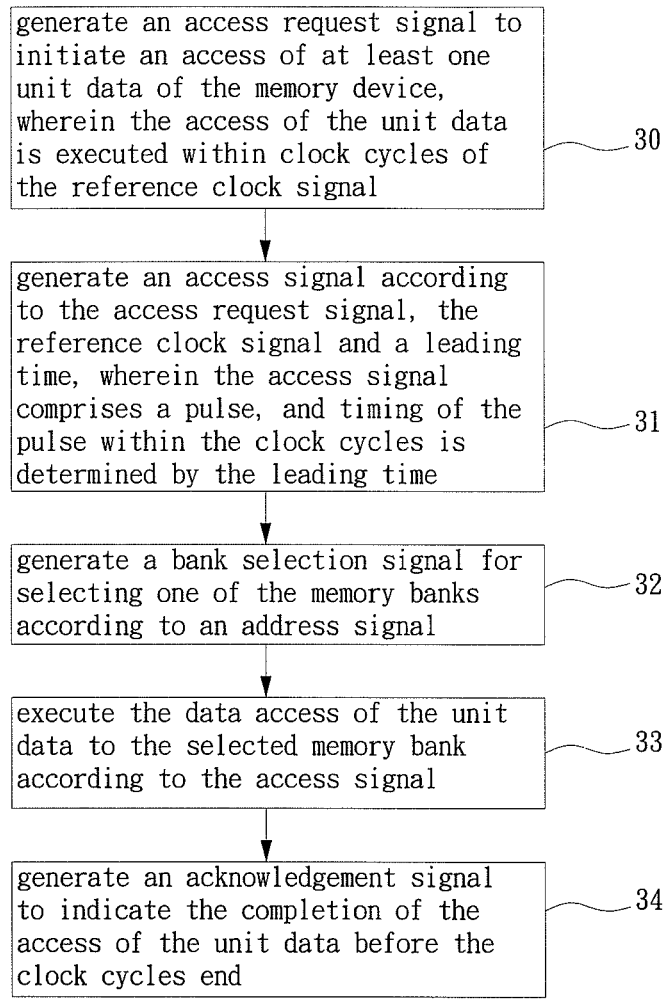
FIG. 3 is a flow chart of a data access method according to an embodiment of the present invention.

FIG. 3 is a flow chart of a data access method according to an embodiment of the present invention. The data access method is for data access of a memory having a plurality of memory banks, and comprises step below.

In Step 30, send an access request signal to initiate an access of at least one unit data of the memory device. The access of the unit data is executed within a plurality of clock cycles of a reference clock signal.

In Step 31, generate an access signal according to the access request signal, the reference clock signal and a leading time. The access signal comprises a pulse, and the timing of the pulse within the clock cycles is determined by the leading time.

In Step 32, generate a bank selection signal for selecting one of the memory banks according to an address signal.

In Step 33, execute the data access of the unit data to the selected memory bank according to the access signal.

In Step 34, generate an acknowledgement signal to indicate the completion of the data access of the unit data before the clock cycles end.

In Step 30, the access request signal is a write request signal or a read request signal. When the access request signal is a write request signal, additionally a data signal corresponding to the write request signal is sent to the memory device in Step 30. A time interval between a starting point of the clock cycles and that of the pulse is the leading time in Step 31. According to one preferred embodiment of the present invention, a trailing time is used for generating the access signal, and is defined as a time interval between the ending point of the pulse and that of the clock cycles in Step 31.

In Step 32, the bank selection signal is generated according to at least one most significant bit of the address signal. In Step 33, the data access of the unit data is executed at the rising edge or falling edge of the pulse.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data access system for generating an access signal to a memory device wherein the memory device comprises registers having flip-flops for storing data stored in the memory device, the memory device executing an access of a unit data according to the access signal, comprising:
    a data processing unit, activating an access request signal to initiate an access of the unit data, wherein the access of the unit data is executed within a plurality of clock cycles of a reference clock signal; and
    a bridge device, comprising an access signal generating unit for activating the access signal in response to the access request signal, the reference clock signal and a leading time, wherein the access signal includes a pulse, and the timing of the pulse within the plurality of clock cycles is determined by the leading time,
    wherein the data processing unit further generates an address signal, the memory device comprises a plurality of memory banks, and the bridge device further comprises an address decoding unit for generating a bank selection signal according to the address signal so as to select one of the memory banks as a selected memory bank to execute the access of the unit data, and
    wherein the leading time takes into account storage locations of the memory device to adjust a timing of a pulse of the access signal.

2. The data access system of claim 1, wherein the bridge device sends an acknowledgement signal indicating the completion of the access of the unit data to the data processing unit before the clock cycles end.

3. The data access system of claim 1, wherein the access signal generating unit generates the access signal further according to a trailing time.

4. The data access system of claim 1, wherein the address decoding unit generates the bank selection signal according to at least one most significant bit of the address signal.

5. The data access system of claim 1, wherein when the access request signal is a write request signal, the data processing unit further sends a data signal corresponding to the write request signal to the memory device.

6. The data access system of claim 5, wherein the data processing unit has data processing ability of N bit width, and N is positive integer; when N is smaller than the bit count of the data signal, the memory device selects N bits of the data signal according to a bit selection signal to execute the access of the unit data.

7. The data access system of claim 6, wherein the address decoding unit generates the bit selection signal according to the address signal.

8. The data access system of claim 6, wherein the memory device selects eight most significant bits or eight least significant bits of the data signal to execute the access of the unit data according to the bit selection signal when N is 8 and the bit count of the data signal is 16.

9. The data access system of claim 8, wherein the address decoding unit generates the bit selection signal according to one least significant bit of the address signal.

10. A data access method for accessing a memory device, the memory device comprising registers having flip-flops for storing data stored in the memory device, the method comprising steps of:
    activating an access request signal to initiate an access of at least one unit data of the memory device, wherein the access of the unit data is executed within a plurality of clock cycles of a reference clock signal;
    activating an access signal in response to the access request signal, the reference clock signal and a leading time, wherein the access signal comprises a pulse, and the timing of the pulse within the clock cycles is determined by the leading time; and
    executing the access of the unit data according to the access signal,
    wherein the memory device comprises a plurality of memory banks, further comprising a step of generating a bank selection signal according to an address signal so as to select one of the memory banks as a selected memory bank to execute the access of the unit data, and wherein the leading time takes into account storage locations of the memory device to adjust a timing of a pulse of the access signal.

11. The data access method of claim 10, further comprising a step of generating an acknowledgement signal to indicate the access of the unit data is completed before the clock cycles end.

12. The data access method of claim 10, wherein the bank selection signal generating step is generating the bank selection signal according to at least one most significant bit of the address signal.

13. The data access method of claim 10, wherein when the access request signal is a write request signal, the data access method further comprising a step of sending a data signal corresponding to the write request signal to the memory device.

* * * * *